US008502806B2

United States Patent
Liang

(10) Patent No.: US 8,502,806 B2
(45) Date of Patent: Aug. 6, 2013

(54) STYLUS HOLDING MECHANISM AND PORTABLE ELECTRONIC DEVICE UTILIZING THE SAME

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 450 days.

(21) Appl. No.: 12/894,292

(22) Filed: Sep. 30, 2010

(65) Prior Publication Data

US 2011/0221711 A1 Sep. 15, 2011

(30) Foreign Application Priority Data

Mar. 15, 2010 (CN) .......................... 2010 1 0124305

(51) Int. Cl.
*G09G 5/00* (2006.01)
(52) U.S. Cl.
USPC ............................................ 345/179; 81/9.2
(58) Field of Classification Search
USPC .................. 345/179; 279/19.1–19.4; 81/9.2
See application file for complete search history.

(56) References Cited

U.S. PATENT DOCUMENTS

| | | | | |
|---|---|---|---|---|
| 6,392,639 B1* | 5/2002 | Lee et al. | ...................... | 345/179 |
| 6,473,076 B1* | 10/2002 | Thompson et al. | ........... | 345/179 |
| 6,664,953 B2* | 12/2003 | Quek | ............................ | 345/179 |
| 6,681,333 B1* | 1/2004 | Cho | ............................... | 713/300 |
| 7,319,460 B2* | 1/2008 | Lee | ................................ | 345/179 |
| 7,333,326 B2* | 2/2008 | Canova et al. | ........... | 361/679.55 |
| 7,349,001 B2* | 3/2008 | Huang et al. | .................. | 345/179 |
| 7,796,382 B1* | 9/2010 | Li | ................................ | 361/679.58 |
| 2002/0003532 A1* | 1/2002 | Huat | ............................. | 345/179 |
| 2003/0067452 A1* | 4/2003 | Liu et al. | ...................... | 345/179 |
| 2003/0184529 A1* | 10/2003 | Chien et al. | .................. | 345/179 |
| 2004/0032402 A1* | 2/2004 | Kuo | ............................... | 345/179 |
| 2006/0132468 A1* | 6/2006 | Lev et al. | ...................... | 345/179 |

* cited by examiner

*Primary Examiner* — Tom Sheng
(74) *Attorney, Agent, or Firm* — Altis Law Group, Inc.

(57) ABSTRACT

A stylus holding mechanism includes a housing, a positioning mechanism and a stylus. The housing defines a receiving space. The positioning mechanism includes a block and a spring. The block forms a projection, and the spring provides elastic force on the block. The stylus is received in the receiving space. The stylus defines a groove, and the projection is received in the groove for releasably locking the stylus.

8 Claims, 5 Drawing Sheets

STYLUS HOLDING MECHANISM AND PORTABLE ELECTRONIC DEVICE UTILIZING THE SAME

BACKGROUND

1. Technical Field

The present disclosure relates to stylus holding mechanisms, and more particularly to a stylus holding mechanism for portable electronic device, such as a mobile phone.

2. Description of Related Art

One kind of portable electronic devices generally has a large screen and the screen is typically pressure-sensitive. A stylus is used as an input device for writing, marking, or pressing on the pressure-sensitive screen.

In some electronic devices, the stylus is mounted to/into an integrated housing thereon, according to which the housing of the electronic device has a deep hole defined, for example in one sidewall thereof, substantially parallel thereto. The stylus is received and retained in the hole by friction therebetween. Even so, the stylus may be separated from the housing as friction between the stylus and the housing gradually decreases with continued use.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead placed upon clearly illustrating the principles of the present stylus holding mechanism for portable electronic device. Moreover, in the drawings, like reference numerals designate corresponding parts throughout the several views.

DETAILED DESCRIPTION

Figure 1:
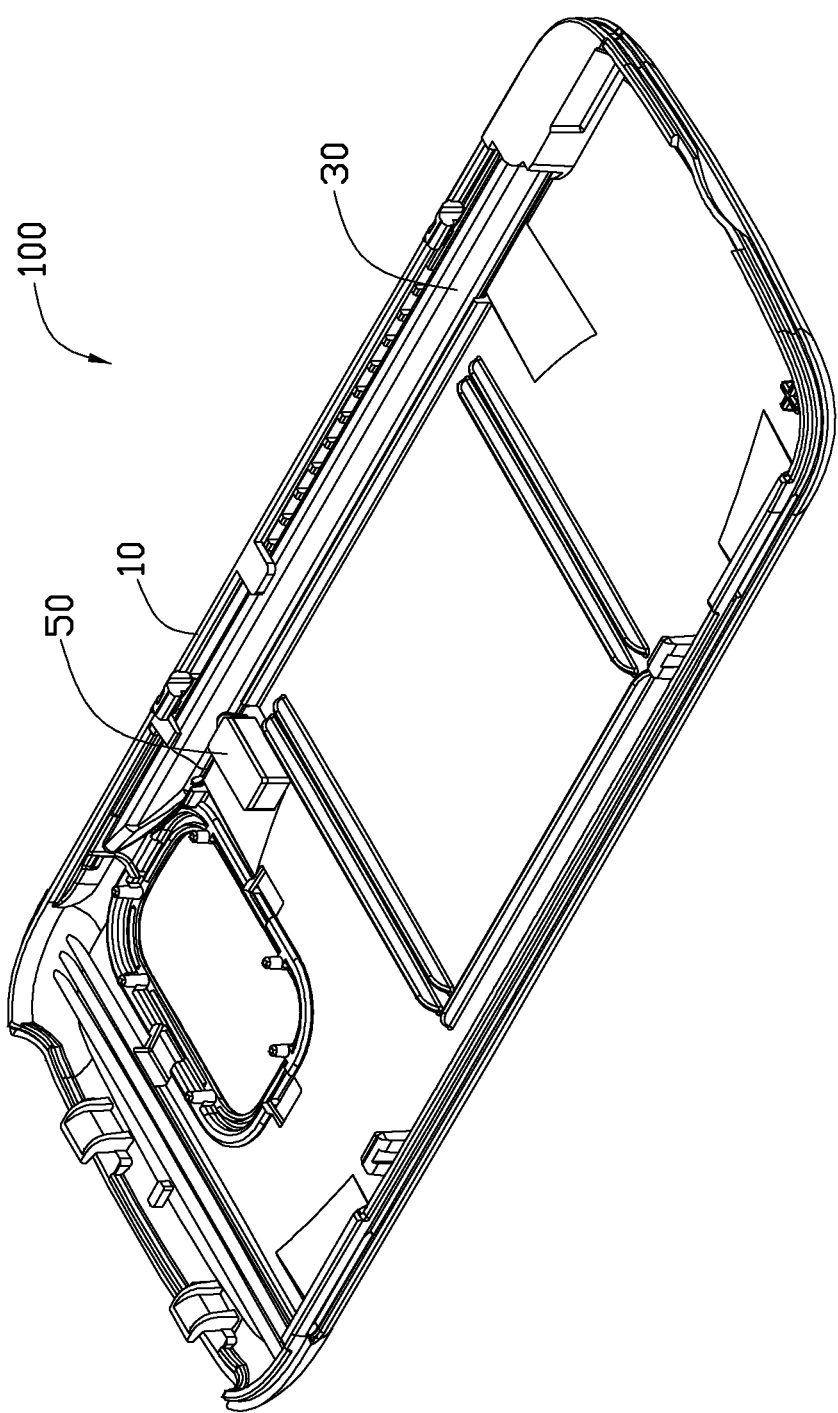
FIG. 1 is an assembled, isometric view of an exemplary stylus holding mechanism for a portable electronic device.

FIG. 1 shows an exemplary embodiment of a stylus holding mechanism 100 for a portable electronic device, such as a mobile phone. The stylus holding mechanism 100 includes a housing 10, a stylus 30, and a positioning mechanism 50.

Figure 2:
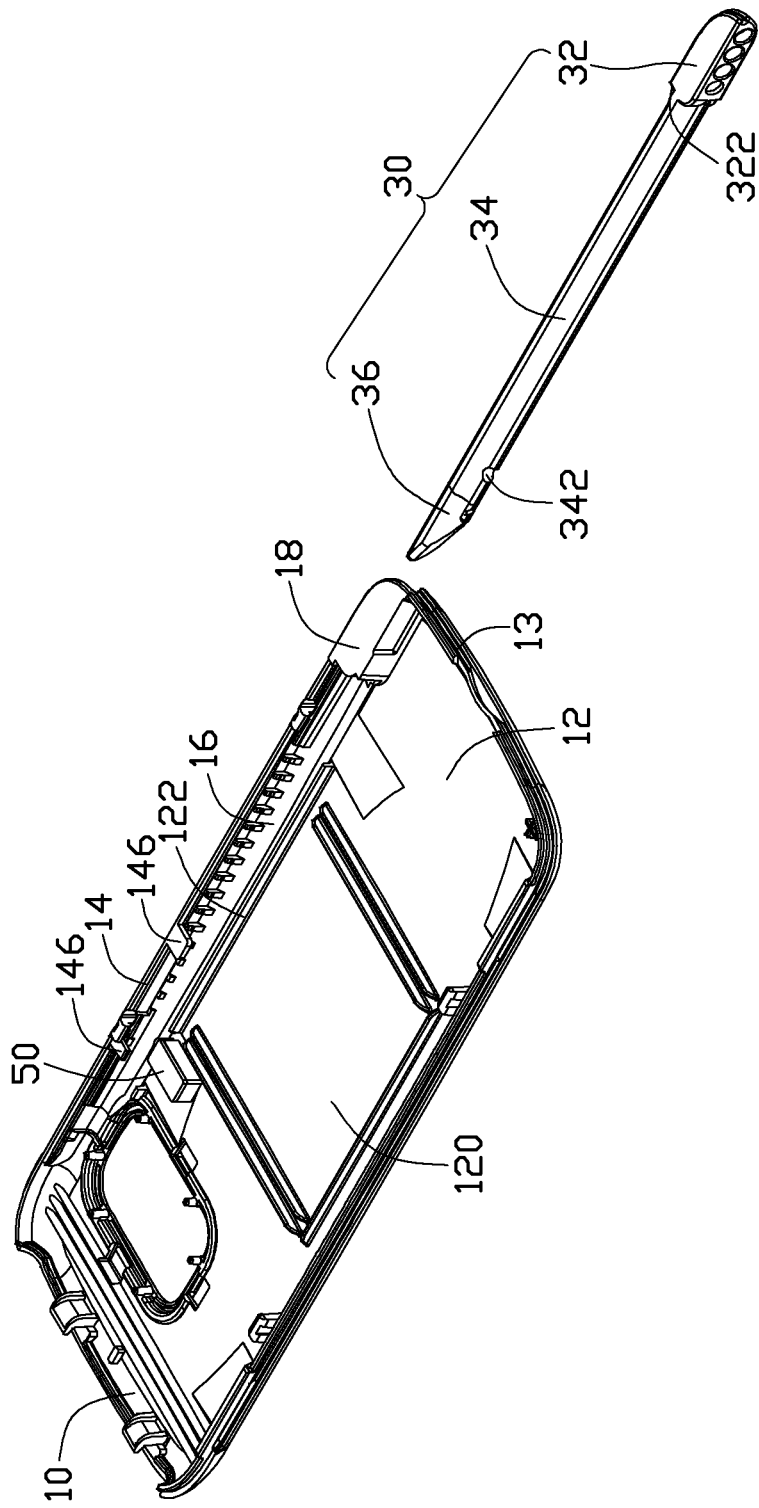
FIG. 2 is a partially, exploded, isometric view of the exemplary stylus holding mechanism.
Figure 3:
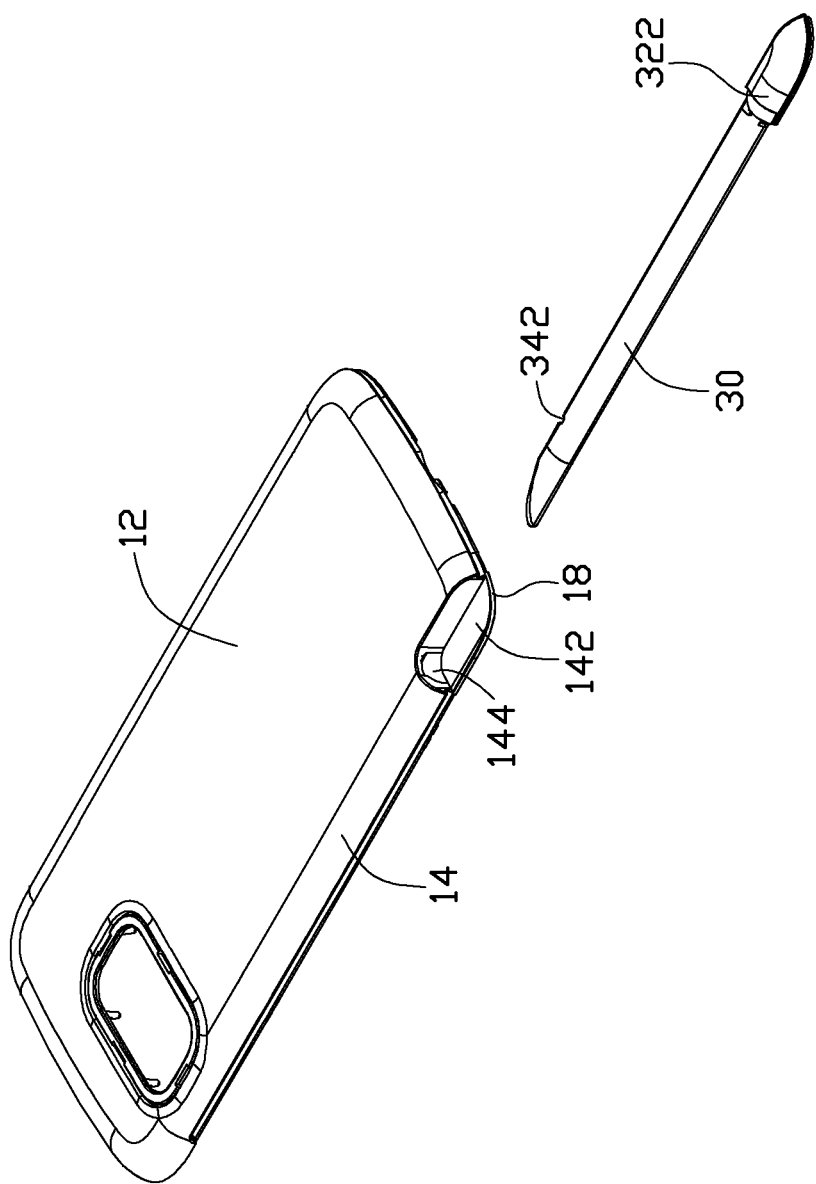
FIG. 3 is similar to FIG. 1, but viewed from another aspect.

Referring to FIGS. 2 and 3, the housing 10 includes a bottom surface 12, opposite end walls 13 and opposite sidewalls 14, thereby cooperatively defining a cavity 120. A dividing plate 122 is positioned in the cavity 120, adjacent to one sidewall 14. The dividing plate 122 is parallel to the sidewall 14. A receiving space 16 is defined between the dividing plate 122 and the sidewall 14 for receiving the stylus 30. A latching portion 18 is formed on one corner of the bottom surface 12 toward the receiving space 16. Two adjacent sides of the latching portion 18 are respectively intersected with one end wall 13 and one sidewall 14 connected to each other. One side of the latching portion 18 protrudes from the bottom surface 12, and the other side of the latching portion 18 is recessed to define a notch 142. The latching portion 18 defines an insertion hole 144 communicating the notch 142 with the receiving space 16. A plurality of tabs 146 perpendicularly extends from the sidewall 14, and spans over the receiving space 16.

The stylus 30 is a substantially thin and long pole. The stylus 30 can be received in the receiving space 16 of the housing 10. The stylus 30 includes a head portion 32, a body portion 34 and a tip portion 36. The head portion 32 can be received in the notch 142. A step 322 is formed between the head portion 32 and the body portion 34. The body portion 34 passes through the insertion hole 144, and can be received in the receiving space 16. The step 322 abuts the latching portion 18. The body portion 34 defines a groove 342 adjacent to the tip portion 36.

Figure 4:
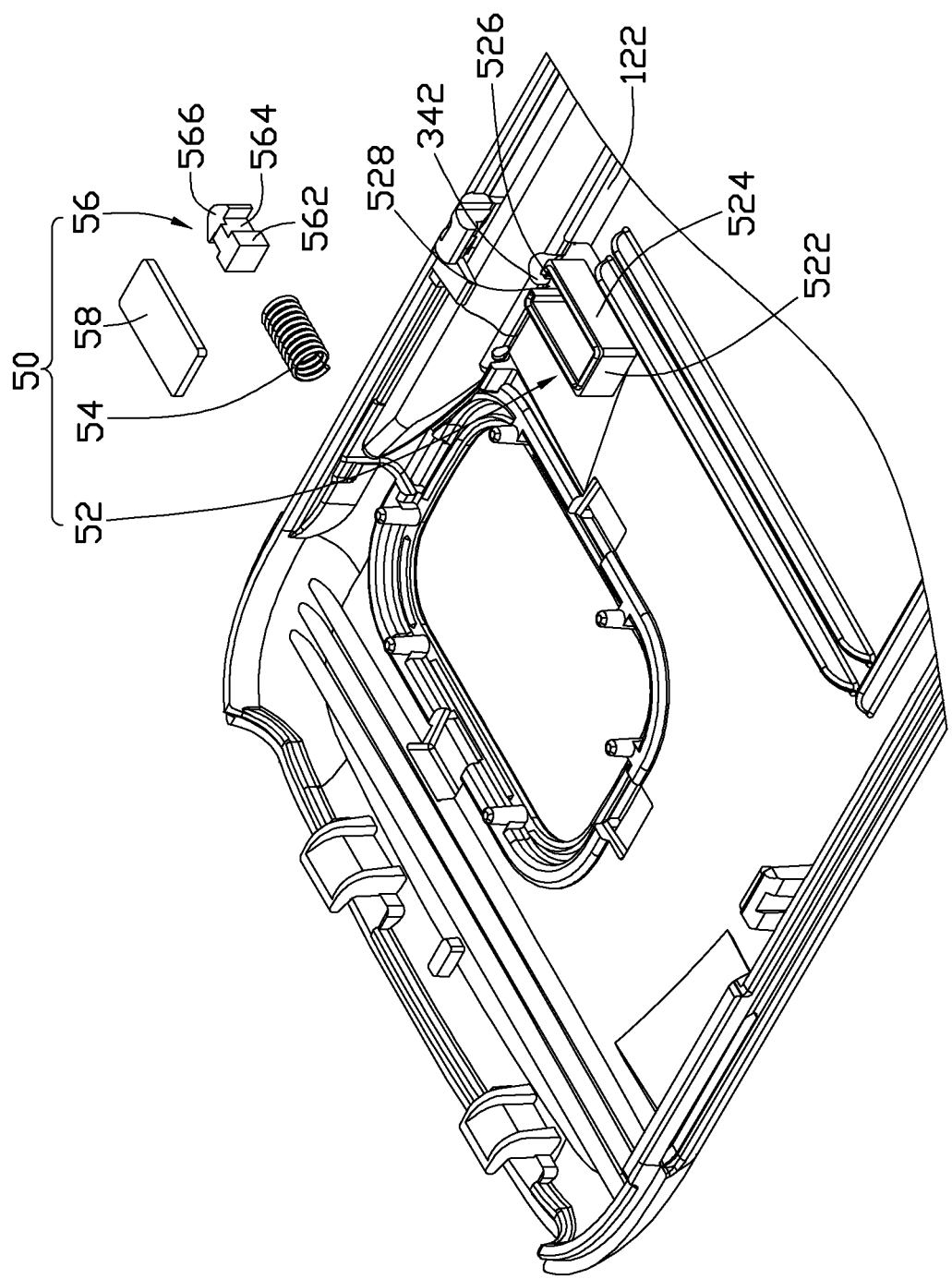
FIG. 4 is an exploded, isometric view of a positioning mechanism shown in FIG. 1.

Referring to FIG. 4, the positioning mechanism 50 includes a frame 52, a compressible spring 54, a block 56 and a cover 58. The frame 52 is positioned on the bottom surface 12, and is adjacent to the dividing plate 122. The frame 52 is substantially U-shaped, and includes a top plate 522, two side plates 524 and two latching tongues 526. The side plates 524 are connected to the top plate 522. Each latching tongue 526 extends from a corresponding side plate 524. The two latching tongues 526 are opposite to each other, and define an opening 528 therebetween. The compressible spring 54 is received in the frame 52. One end of the compressible spring 54 abuts the top plate 522. The block 56 may be slidably positioned in the frame 52. The block 56 includes a base 562, a neck 564 and a projection 566 integrally formed together. The base 562 can be received in the frame 52. A width of the base 562 exceeds that of the opening 528 between the latching tongues 526, preventing the base 562 from passing through the frame 52. The projection 566 is substantially triangular, and a bottom edge of the projection 566 is longer than the opening 528 to prevent the projection 566 from entering the frame 52. A peak portion of the projection 566 is received in the groove 342. The cover 58 can be detachably positioned on the frame 52 to enclose the frame 52.

Figure 5:
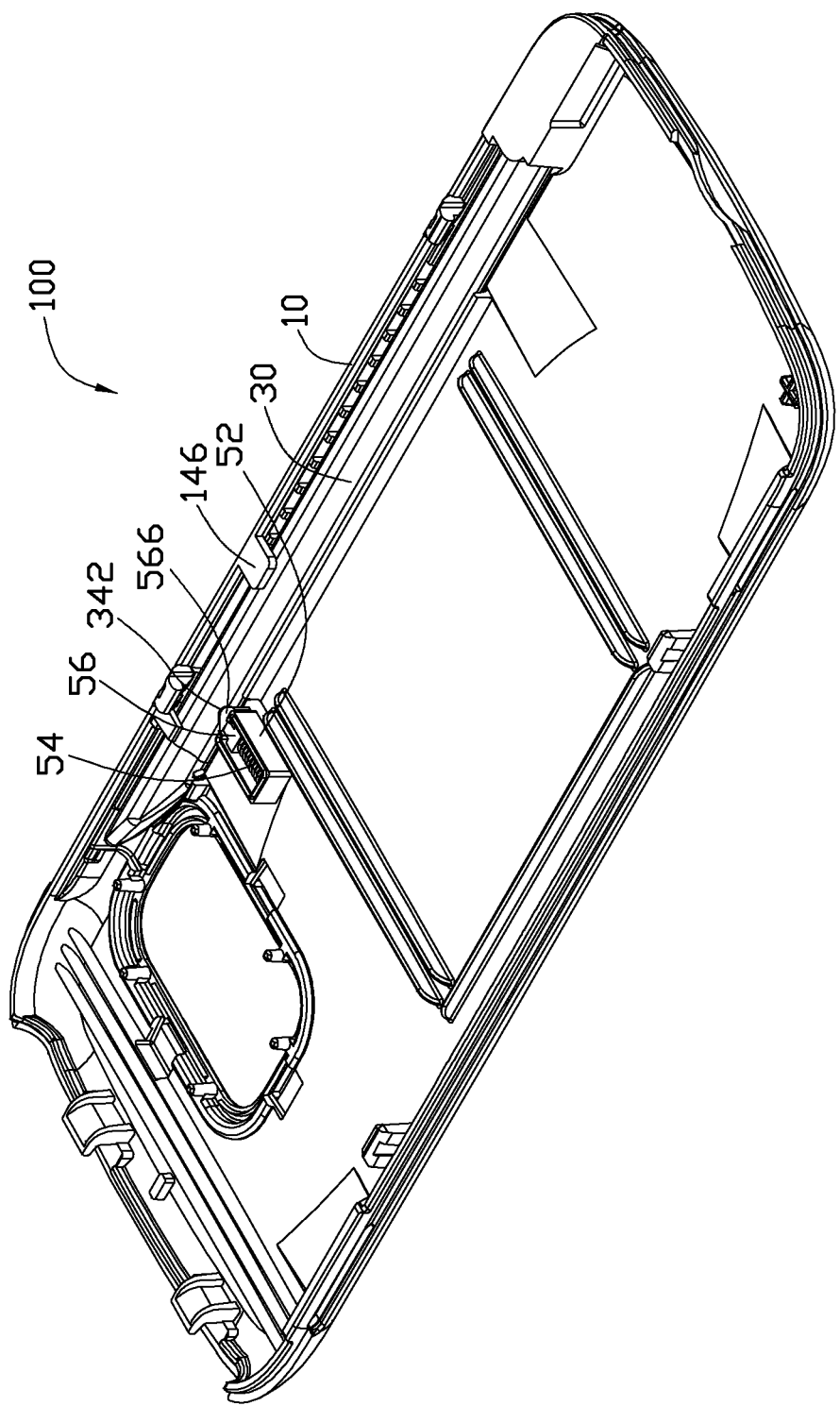
FIG. 5 is a partially assembled, isometric view of the exemplary stylus holding mechanism shown in FIG. 1.

Referring to FIG. 5, when the positioning mechanism 50 is assembled, the compressible spring 54 is received in the frame 52. The neck 564 of the block 56 is received in the opening 528, and the base 562 is received in the frame 52. The projection 566 is positioned outside of the frame 52, toward the receiving space 16. One end of the compressible spring 54 abuts the top plate 522, and the other end abuts the base 562. The cover 58 is attached to the frame 52 by adhesive. The stylus 30 is received in the receiving space 16 through the insertion hole 144. The head portion 32 of the stylus 30 is received in the notch 142, and the projection 566 is received in the groove 342, securely retaining the stylus 30 to the housing 10.

In use, pulling force on the head portion 32 of the stylus 30 causes body portion 34 to compress the projection 566 on compressible spring 54, allowing projection 566 to exit the groove 342. Thus, the stylus 30 can be easily removed from the receiving space 16 for use with a touch screen of the housing 10.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely preferred or exemplary embodiments.

What is claimed is:

1. A stylus holding mechanism comprising:
    a housing defining a receiving space;
    a positioning mechanism including a frame, a block and a spring; the block forming a projection at one end thereof, the spring received in the frame, the frame defining an opening, the projection exposed from the opening, and the spring providing an elastic force to the block;

a stylus receivable in the receiving space, the stylus defining a groove in which the projection is received, for releasably retaining the stylus.

2. The stylus holding mechanism of claim 1, wherein the block includes a base and a neck integrally formed with the projection, the neck positioned between the base and the projection, one end of the spring abuts against the frame, and another end of the spring abuts against the base.

3. The stylus holding mechanism of claim 2, wherein the frame is substantially U-shaped, and includes a top plate, two side plates and two latching tongues, the side plates connected to the top plate, each latching tongue extends from a corresponding side plate, the two latching tongues are opposite to each other, and define the opening therebetween.

4. The stylus holding mechanism of claim 3, wherein a width of the base exceeds the opening between the latching tongues to prevent the base from passing through the frame.

5. The stylus holding mechanism of claim 3, wherein the projection is substantially triangular, and a bottom edge of the projection exceeds the width of the opening to prevent the projection from moving into the frame from the opening.

6. A portable communication device comprising:

a housing defining a receiving space and forming a latching portion;

a positioning mechanism including a frame, a spring, and a block, the block including a base, a neck and a projection integrally formed together, the neck positioned between the base and the projection, the spring received in the frame, and the block slidably received at the neck;

a stylus receivable in the receiving space, one end of the stylus defining a groove in which the projection can be received, thereby releasably securing the stylus, the other end of the stylus receivable in the latching portion.

7. The portable communication device of claim 6, wherein the frame is substantially U-shaped and includes a top plate, two side plates and two latching tongues, the side plates are perpendicularly connected to the top plate, each latching tongue extends from a corresponding side plate, the two latching tongues are opposite to each other, and defines an opening therebetween.

8. The portable communication device of claim 7, wherein a width of the base exceeds the opening between the latching tongues.

\* \* \* \* \*